(12) United States Patent
Gallagher et al.

(10) Patent No.: US 12,231,259 B2
(45) Date of Patent: Feb. 18, 2025

(54) MESSAGE ID DECODING METHOD

(71) Applicant: Eaton Intelligent Power Limited, Dublin (IE)

(72) Inventors: Colm Gallagher, Dublin (IE); Julia O'Connell, Dublin (IE); Luke Killoran, Dublin (IE); Niall Cahill, Dublin (IE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 362 days.

(21) Appl. No.: 18/007,750

(22) PCT Filed: Dec. 14, 2020

(86) PCT No.: PCT/EP2020/085990
§ 371 (c)(1),
(2) Date: Dec. 2, 2022

(87) PCT Pub. No.: WO2021/170279
PCT Pub. Date: Sep. 2, 2021

(65) Prior Publication Data
US 2023/0239173 A1  Jul. 27, 2023

(30) Foreign Application Priority Data

Feb. 28, 2020 (GB) .................... 2002906

(51) Int. Cl.
*H04L 12/40* (2006.01)
*B60L 3/12* (2006.01)
*B60R 16/03* (2006.01)

(52) U.S. Cl.
CPC ............ *H04L 12/40* (2013.01); *B60L 3/12* (2013.01); *B60R 16/0315* (2013.01); *H04L 2012/40215* (2013.01); *H04L 2012/40273* (2013.01)

(58) Field of Classification Search
CPC .......... H04L 12/40; H04L 2012/40215; H04L 2012/40273; H04L 2012/40267; B60L 3/12; B60R 16/0315
(Continued)

(56) References Cited

U.S. PATENT DOCUMENTS

2009/0185215 A1\* 7/2009 Kreppold ............ G06F 12/0661
358/1.15
2017/0018123 A1\* 1/2017 Gumpert .............. G01R 31/007
(Continued)

FOREIGN PATENT DOCUMENTS

CN  106257863 A  \* 12/2016  ............. G06F 13/36

*Primary Examiner* — Wing F Chan
*Assistant Examiner* — John Fan
(74) *Attorney, Agent, or Firm* — LEYDIG, VOIT & MAYER, LTD.

(57) ABSTRACT

A message ID decoding method is provided for a system comprising multiple components interlinked by a Controller Area Network bus (CAN-bus) through which messages are sent. The method includes acquiring a CAN-bus message data stream including multiple CAN-bus messages, each including a CAN ID indicating a component from which the corresponding CAN-bus message originated; storing the CAN-bus messages in a first datastore; acquiring an electricity consumption signal indicative of the consumption of the component; storing the electricity consumption signal in a second datastore; generating multiple time-stamp bins each corresponding to an interval in time; selecting the CAN ID and a portion of the electricity consumption signal being from the interval in time corresponding to the time-stamp bin; and determining a regression coefficient, R, indicating a level of relatedness between the selected CAN ID and portion, thereby correlating the CAN ID of the selected CAN-bus message with the component.

25 Claims, 4 Drawing Sheets

(58) Field of Classification Search
USPC .......................................................... 709/238
See application file for complete search history.

(56) References Cited

U.S. PATENT DOCUMENTS

2017/0126679 A1* 5/2017 Fredriksson .......... H04L 63/123
2019/0052654 A1* 2/2019 Juliato ................ H04L 63/1416
2019/0308589 A1* 10/2019 Maluf ................. H04L 12/2803

* cited by examiner

MESSAGE ID DECODING METHOD

CROSS REFERENCE TO RELATED APPLICATIONS

This application is a U.S. National Phase application under 35 U.S.C. § 371 of International Application No. PCT/EP2020/085990, filed on Dec. 14, 2020, and claims benefit to British Patent Application No. GB 2002906.2, filed on Feb. 28, 2020. The International Application was published in English on Sep. 2, 2021 as WO 2021/170279 A1 under PCT Article 21(2).

FIELD

The invention relates to a message ID decoding method for a system comprising multiple components interlinked by a bus, such as a Controller Area Network bus (CAN-bus), through which messages are sent.

BACKGROUND

Electric vehicles (EVs) are growing in popularity due to their reduced environmental impact over combustion engine vehicles. Advances are being made in EV technology. One area of advancement is in the Power Distribution Unit (PDU) of EVs. The PDU is a key component in an EV as it controls the distribution of power to all the components/devices of the EV, including critical traction and auxiliary loads, while protecting the components and vehicle occupants with reliable circuit protection solutions. The key elements which are commonly found in PDU systems, and most relevant to the PDU discussed within this document are: the main battery contactors, the traction inverter power distribution, fuse protection, fuse coordination with contactors for circuit protection, auxiliary circuit power distribution and protection, integrated pre-charge circuit, and direct current (DC) sensing. The PDU only has access to circuit-level electrical consumption information for components of the EV. Multiple components may be drawing from the circuit simultaneously resulting in an aggregated electricity consumption signal. Therefore, disaggregating the aggregated electricity consumption signal through the PDU would be useful in improving and optimising the overall components and system of the EV.

The inventors of the present disclosure recognize that optimizing the PDU could result in improved EV battery performance as the PDU can infer the electricity usage of the vehicle from how it distributes power to each of the components. Optimization of the traction inverter, which converts the DC current from the vehicle's battery to AC current in order to drive the motor's drivetrain, could also be improved as a result of the optimised PDU. In addition, the health of the EV battery may also be improved with monitoring the charging and discharging of the battery via the PDU.

However, challenges arise in obtaining the information of the PDU and consequently the information related to the operation of the vehicle. Current systems and methods in the art do not provide disaggregated information about power distribution within an EV, which means it can be difficult to extract details such as driver behaviour, vehicle maintenance and predicted component power output. The vehicle bus network within an electric vehicle, commonly known as Controller Area Network (CAN), interlinks the various components of the vehicle. The CAN does provide information embedded in messages for communicating the individual vehicle operations between each of the electronic control units (ECU) associated with each vehicle component. In particular, the CAN-bus is designed to allow microcontrollers and devices to communicate with each other and their corresponding applications without the need for a host computer. Typical EVs can have up to 70 ECUs for the various components and subsystems, which include ECUs for the EV battery, transmission, brakes, power steering, audio systems, lighting, to name a few. Communications between each of these components is necessary in any sort of vehicle, be it an EV or a combustion-type vehicle. An example of the communications sent over the CAN-bus network can be as simple as the driver pressing the brake pedal and the ECU for the pedal sending a message to the brake ECU to engage, and also sending a message to the ECU associated with the lighting subsystem to illuminate the brake lights. This is merely by way of example as the overall communication within a vehicle, especially an EV, is highly complex. The data transmission rates of the message frames and/or data packets can be up to 1 Mbit/s.

CAN-bus messages travel through the bus between the components as a data stream. The CAN-bus messages are encoded with unique ECU IDs which correspond to the particular components and their ECUs from which the messages (data packet) originate. Often these ECU IDs are encoded by vehicle manufacturers, who do not disclose the codes, and as such the information flowing on these message streams is difficult to correlate with the EV components. What is more, vehicles, both EV and combustion-type, may have an abundance of components produced by a variety of different manufacturers before being assembled in the final vehicle, which adds to the complexity. As a consequence, there are a great number of messages flowing in the CAN-bus network that cannot be deciphered. Accordingly, it is a challenge for tier one automotive part manufacturers to utilize data flowing through the CAN-bus to improve their products.

It follows that there is a need to provide a method for decoding vehicle bus messages, in particular CAN-bus messages, disaggregating the electrical power as distributed in the PDU, and correlating the electrical power with each of the vehicle operations as communicated in the CAN-bus messages, providing a more comprehensive data store which can be used for component/device condition monitoring, inferring driver behaviour and optimised power distribution.

SUMMARY

In an embodiment, the present disclosure provides a message ID decoding method for a system comprising multiple components interlinked by a Controller Area Network bus (CAN-bus) through which messages are sent. The method includes acquiring a CAN-bus message data stream including multiple CAN-bus messages, each CAN-bus message including a CAN ID, each CAN ID indicating a component from which the corresponding CAN-bus message originated; storing the multiple CAN-bus messages in a first datastore; acquiring an electricity consumption signal, wherein the electricity consumption signal is indicative of the electricity consumption of a component in the system; storing the electricity consumption signal in a second datastore; generating multiple time-stamp bins, each time-stamp bin corresponding to an interval in time; selecting, from their respective datastores, the CAN ID and a portion of the electricity consumption signal, the CAN ID and the portion of the electricity consumption signal being from the interval in time corresponding to the time-stamp bin; and determining a regression coefficient, indicating a level of relatedness between the selected CAN ID and the selected portion of electricity consumption signal, thereby correlating the CAN ID of the selected CAN-bus message with a component.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

The challenges as described above can be addressed independently. For CAN-bus ID decoding, numerous heuristics can be employed to infer the identity of the various ECUs. For disaggregation of the power signal, a range of algorithms have been devised to disaggregate electricity consumption signals. Embodiments of the present invention can identify a joint-approach that leverages the relationship between CAN-bus messages and the response they cause in the electrical system of an EV.

In general terms, embodiments can provide a method for jointly decoding CAN-bus messages and disaggregating electrical power. In particular, embodiments can create CAN-bus message streams for each ECU ID. These streams are then mapped using multivariable regression to the aggregated electrical energy signal, acquired by sensing equipment on the electrical circuit. Using various heuristics, the CAN IDs are decoded and the energy signal is disaggregated to component level usage.

In a first aspect of the present invention, there is provided a message ID decoding method for a system comprising multiple components interlinked by a CAN-bus through which messages are sent, the method comprising: acquiring a CAN-bus message data stream comprising multiple CAN-bus messages, each CAN-bus message comprising a CAN ID, each CAN ID indicating a component from which the corresponding CAN-bus message originated, storing the CAN-bus messages in a first datastore, acquiring an electricity consumption signal, wherein the electricity consumption signal is indicative of the electricity consumption of a component in the system, storing the electricity consumption signal in a second datastore, generating time-stamp bins, each time-stamp bin corresponding to an interval in time, selecting, from their respective stores, a CAN ID and a portion of the electricity consumption signal, the CAN ID and the portion of the electricity consumption signal being from an interval in time corresponding to a time-stamp bin, and determining a regression coefficient, R, indicating the level of relatedness between the selected CAN ID and the selected portion of electricity consumption signal, thereby correlating the ID of the selected CAN-bus message with a component.

The CAN-bus messages may be communicated on a CAN-bus network.

The CAN-bus messages may be acquired and stored in real time.

The CAN-bus messages may be stored by subset, each subset comprising CAN-bus messages with the same CAN ID.

Each CAN-bus ID may be associated with a component having an electronic control unit (ECU) ID.

The CAN-bus messages may be managed by a CAN controller.

Embodiments of the present invention may further comprise a CAN-bus interface module, wherein the CAN-bus interface module can listen to and monitor the plurality of CAN-bus messages on the CAN-bus network, acquire the CAN-bus messages and/or store the CAN-bus messages in a datastore.

The multiple components and electricity consumption signal may be accessed and controlled by a power distribution unit (PDU).

The electricity consumption signal may be an aggregated signal, comprising an aggregation of electricity consumption signals from multiple components.

Embodiments of the present invention may further comprise disaggregating the electricity consumption signal based on the relatedness value of the regression coefficient.

The PDU may comprise a power processing unit (PPU).

Each electrical component may have a corresponding power signature.

Each power signatures may be acquired by measuring the current and voltage signals as a time series.

Acquiring the CAN-bus message data stream and the electrical power signal may be performed simultaneously.

The timestamp bins may be generated for the CAN-bus message data stream and the electricity consumption signal.

The timestamp bins of the higher frequency signal, of the CAN-bus message data stream or the electricity consumption signal, may be adjusted down to the timestamp bins of the lower frequency signal.

The CAN-bus message data stream or the aggregated electricity consumption signal may be adjusted up to the timestamp bins of the higher frequency signal.

The timestamp bins of the CAN-bus message data stream and the electricity consumption signal may be the same.

The CAN-bus message IDs may be aligned with the electricity consumption signal through multivariable regression.

The regression coefficient may be determined with regression time intervals which are <1 second.

A high value of regression coefficient, which may be R>0.7, indicates a high level of relatedness.

A low value of regression coefficient, which may be R<0.7, indicates a low level of relatedness.

The CAN-bus ID messages may be decoded per electrical power signal based on known power system characteristics and heuristic energy use.

According to a second aspect, there is provided a system or module for decoding message IDs of multiple electrical components on a CAN-bus network, wherein the system or module comprises a processor for executing the method of the first aspect.

According to a third aspect, there is provided a computer program which, when executed on a processor, causes the processor to execute the method of the first aspect.

Figure 1:
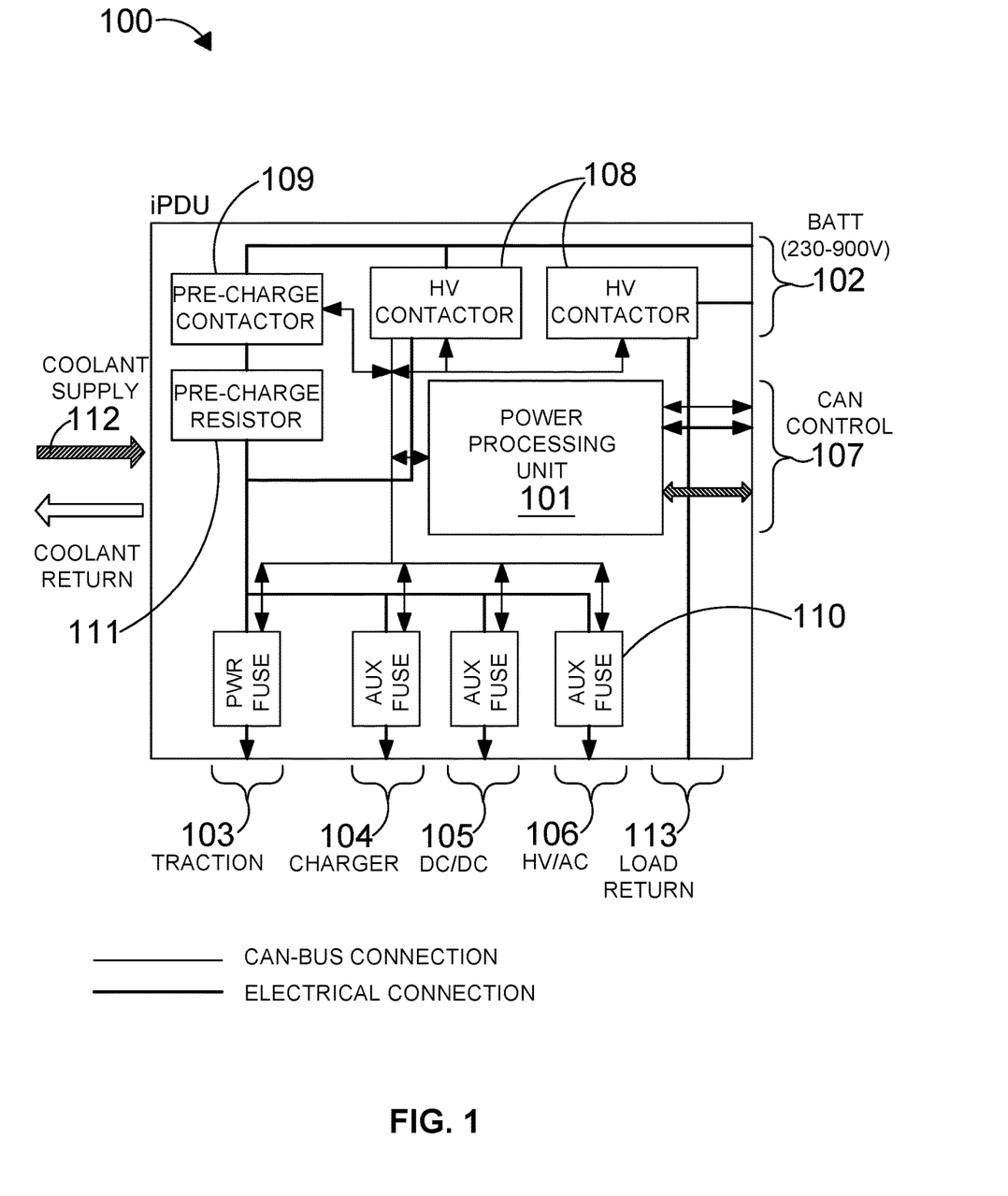
FIG. 1 shows a power distribution unit (PDU)

FIG. 1 provides an example power distribution unit (PDU) as described throughout this disclosure. Namely, the diagram of the PDU component 100 in FIG. 1 is a simplified version of a typical Eaton intelligent PDU which can permit the execution of the proposed method, however other PDUs may be used in the implementation of the method disclosed. It will be understood that in some cases the PDU may not be required, and that the PDU embodiment is discussed in this document is by way of example of distributing power of a device/component fitted with multiple outputs.

FIG. 1 illustrates a preferred embodiment of the PDU component 100, in that the PDU component is tightly integrated within an electric vehicle having access and control over a plurality of components/devices within an EV. Further, it is positioned to sense the electricity usage of the vehicle and thus acquire electricity consumption information. The power processing unit (PPU) 101 in FIG. 1 communicates with the various components, mainly between the battery 102 and the component features such as traction 103, charger 104, DC/DC 105 and HVAC 106, as illustrated. This communication is performed using the CAN-bus network which interlinks the components of the EV. CAN-bus messages travel through the CAN-bus network as a data stream. The CAN-bus network is managed by the CAN controller 107, where the controller 107 may be an integral part of the one or more microcontrollers. The CAN controller 107 receives and sends the CAN-bus messages between the communicating components, managing the messages in serial bits on the vehicle bus network. Each CAN-bus message comprises an CAN ID, corresponding to the component and its ECU from which it originates, and a payload.

For any operation to occur, the PPU 101 can communicate with the battery 102, by sending a message in data packets via the HV contactors 108 (and pre-charge contactor 109), to send an electrical signal from the battery 102 via the HV contactors 108 to the plurality of components providing the necessary electrical energy to engage the desired component as defined in the CAN-bus message. The battery 102 can have a typical voltage in the range 230V-900V, depending on vehicle size and/or model. Each component has a fuse 110 to protect the component against any electrical surges. The fuses 110 have the capability of measuring voltage and impedance of the power in the circuit of the corresponding component part or device it serves. This allows a power signature to be generated for each component or device. Pre-charge contactors 109 and resistors 111 are incorporated into the PDU 100 to limit the initial inrush current during power up of the battery 102 due to the high voltage direct current (HVDC) flowing from the battery 102 on start up. These are commonly used in high-voltage systems to suppress the high electric current at turn-on, wherein the high current can cause considerable damage to the system components. The pre-charging elements 109, 111 in the PDU 100 therefore aid in prolonging the operating lifespan of the electronic components, making the system more reliable. The PDU 100, as illustrated in FIG. 1, is provided with a cooling system 112, commonly found in high voltage electronics, wherein coolant is supplied to the PDU 100 to protect the components and circuits from overheating. Again this helps to extend the lifespan of the electronic components and devices. The PDU system 100 also features a necessary load return 113 for any excess current flowing in the system. It will be understood that other PDU configurations may be apparent depending on the manufacturer and the placement within the EV vehicle.

Figure 2:
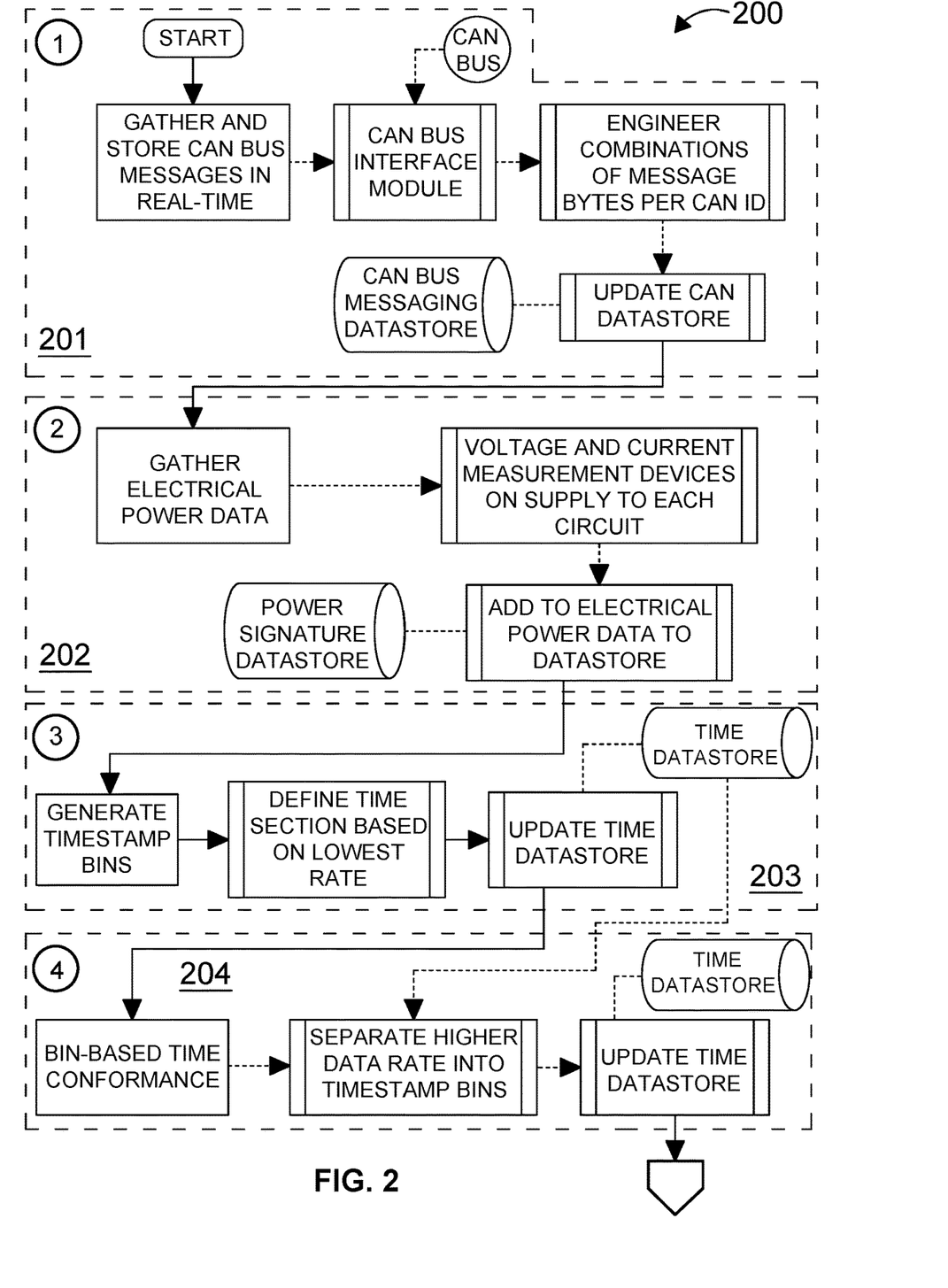
FIG. 2 illustrates a simple process flow diagram showing the first steps 1-4 (part I) of a method of the disclosure.

FIG. 2 depicts the first part of a method 200 of the invention, wherein the illustrated flow diagram presents the method steps in executing the first part of the process, i.e. steps 1-4. The initial step 201 of FIG. 2 presents the sub-steps in obtaining the information from the CAN-bus network such as capturing/acquiring CAN-bus messages, and creating and storing message streams for each unique CAN-bus ID. In this step 1, the CAN-bus messages are acquired in real-time and stored in a CAN datastore for determining each message ID. A CAN-bus interface module, or any equivalent data communication microchip, is connected to the CAN-bus network providing an interface, between the CAN-bus and a PC or other device. This interface module is linked to the system, and provides the capability to listen to and monitor all of the plurality of CAN-bus messages on the network. These CAN-bus interface modules are regularly used in the automotive industry for accessing the CAN-bus network, providing diagnostics and monitoring of the various electrical component parts. In this initial stage the CAN-bus interface module provides the necessary means for data acquisition, allowing the CAN-bus messages to be acquired and stored in the CAN datastore. Each CAN-bus message will be carrying a payload of information through the network from one ECU to another. The module creates a list of unique CAN IDs from the incoming payloads. Each CAN ID refers to a particular ECU. The list is arranged in subsets, with a subset corresponding to each unique CAN ID. For each new payload communicated on the CAN-bus network, the CAN ID is added to the datastore as a new subset. Messages which contain the same CAN ID, i.e. transmitting a payload signal from one particular ECU, will be added to the same subset. For every message that is communicated with the same CAN ID, it will be added to the data stream. If a new message is sent from a new CAN ID, the message is appended to a new list and any subsequent messages communicated from the new CAN ID will be added to that message stream queue. This produces a mapped structure of CAN-bus messages for easier identification and decoding. From each of these stored message streams the payload containing the actual intended message can be extracted. Byte level analysis is performed to execute the extraction and create the actual intended messages embedded within the payloads, resulting in the decoding of the CAN messages. The combinations of message bytes can be engineered for each CAN-ID. All these updated combinations of message stream bytes are added to the CAN-bus messaging datastore, wherein the byte level combinations reflect real-world byte level analysis values, i.e. the message streams will vary depending on the frequency of the messages from a particular ECU.

The electrical power data is then acquired from each circuit of the PDU, as illustrated in step 2 (202) of FIG. 2. It will be realised that this step can occur simultaneously with step 1. The current and voltage signals associated with one or more circuit components of the PDU, i.e. for each of the circuits that has a corresponding ECU, is measured and recorded. This is accomplished by using common 1-V measurement devices on supply to each circuit, either through system aggregation or circuit aggregation. The voltage and current data comprises multiple signatures from multiple components/loads on the circuit, which is referred to as an aggregated signal. In the case of measuring the total voltage and current input to the PDU, the PDU contains signatures from each load in the system, and as such is referred to as system aggregation. However, if there is a sensor on each circuit then this is referred to as circuit aggregation, i.e. only refers to loads on that particular circuit. For either case of system or circuit aggregation, each 1-V measurement is performed as a time series, gathering the power output associated with each circuit component over time. The recorded time series data is stored in a time series power signature data store, with a corresponding time stamp associated with the 1-V measurement, as depicted in the sub-steps of 202 of FIG. 2.

Once the acquisition of the CAN-bus network information and the electrical power data is generated, an alignment of these two data series is implemented as depicted in step 3 of FIG. 2. This enables the analysis of the data to be executed as is illustrated by the sub-steps in 203. Timestamp bins are generated to correlate the CAN-bus message data with a portion of the electricity consumption data signal. The timestamps are based on the lowest frequency signal of the two data series. For example, if the CAN-bus messaging signal is of a lower frequency (3 Mb/s) than the power signature signal (5 Mb/s), then the timestamp will be correlated based on the CAN-bus messages. It may be that different CAN messages may have different sampling rates, therefore timestamp bins are generated accordingly, with the defined time sections based on the lower frequency signal. The time data is updated with the adjusted time sections and subsequently stored in the time datastore.

The higher frequency data/signal is aligned to the lower frequency signal as depicted by the sub-steps 204 in step 4 of FIG. 2. The updated time datastore based on the lower frequency timestamp from step 3 provides the time section to implement a bin-based time conformance, aligning the two portions of data. The higher frequency data series, of the two data series, is down-sampled to the time section that has been previously determined and stored. The data set of the higher frequency series is then separated into bins that correspond to a lower rate based on the timestamp rate of the lowest frequency signal. This may be subject to a configurable minimum. For example, the difference between the two signal frequencies may be considerably different such that the correlation between the two signals does not align, therefore the extracted information would be inaccurate. If the higher frequency were the power data signatures, for example, then there may be a large number of different power data sets corresponding to different electronic components being sent over the network signal to the power datastore for each individual CAN-bus message stream sent to the CAN-bus message datastore. This would result in misaligning the CAN-bus message to the correct power series measurement as several power data sets would fall within the lower frequency timestamp data portion. It will be realised that although this method aligns two data series it may be applied to three or more data series to determine a correlation of information. Binning each of the data series into the same time sections with the same frequency allows the two series to align. This alignment of data series with the generated timestamp bins is stored in the time datastore for later use. Thus, the datastore will store a plurality of aligned timestamp data and will be continuously updating for each of the timestamps created. From a database perspective, this process is seen as an outer merging of two data sources, wherein the merging of two data sources includes merging every column and row of each data source. For example, in this case of time alignment, a row in one data source and a row in another data source that have the same timestamp are matched up and joined into a single row. This differs from an 'inner' merge where only rows that feature in both tables would be kept and anything is dropped. Where there is no match, the value 'NaN' is matched to it, which stands for Not-A-Number or not available. It will be realised that this method may be adapted by up-sampling the lower frequency data series to the higher frequency data series, wherein the timestamp bins of the data series with the lower frequency are matched to the timestamp bins of the data series with the higher frequency. However, this may result in many more values matched with a 'NaN' value. Further to the above method, other time alignment measurement functions may be used, however, care must be taken to avoid any systematic variations in rate, amplitude and phase as this may cause inaccuracy in the alignment, and thus a miss-correlation of information.

Figure 3:
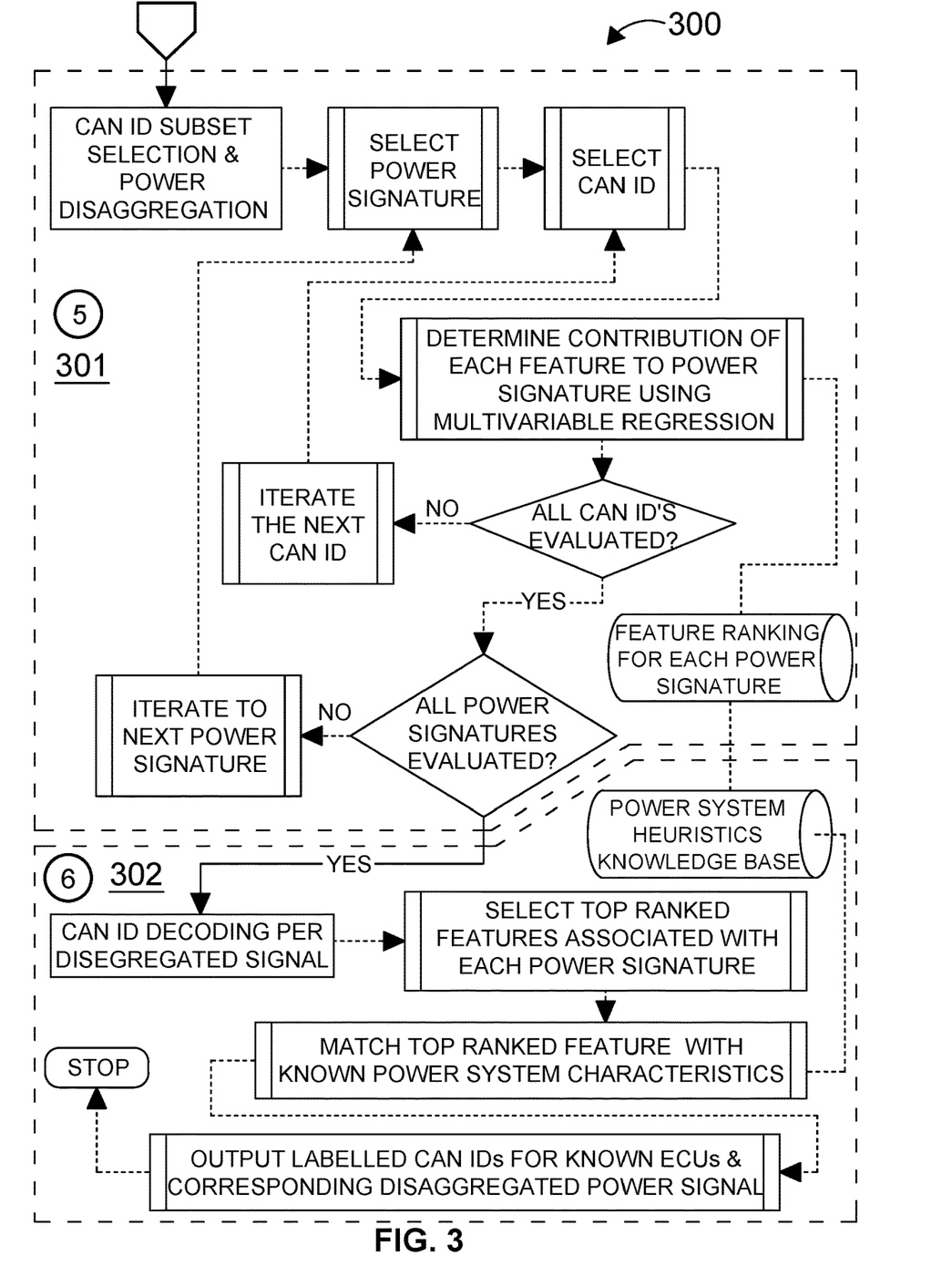
FIG. 3 illustrates a simple process flow diagram showing the second steps 5-6 (part II) of a method of the disclosure.

FIG. 3 depicts the second part of a method embodiment of the present invention, wherein the illustrated flow diagram presents the method steps in executing the second part of the process, i.e. steps 5 and 6. The penultimate collection of sub-steps 301, step 5, of the method implements the algorithm for CAN ID subset selection and power disaggregation. The algorithm starts by selecting a CAN ID subset from the time datastore and along with the timestamped power signature signal, as shown in FIG. 3. The unique byte-level data stream, i.e. the CAN ID messages, is then mapped to the aggregated electrical signal using online multivariable regression to determine the contribution of each unique ID feature to the power signature. The multiple regressions are performed at fixed intervals over time, with a new regression having a new fixed time interval. Typically, the time intervals are <1 second, allowing time to capture dynamics in both sets of signals. The minimum time interval is linked to the minimum sampling time of CAN bus messaging, i.e. can only map one CAN message at a time to the electrical signal. The maximum time interval is the maximum time for CAN message sampling. Each time interval regression will result in a regression coefficient associated for each data series for each interval of time. The regression coefficient is indicative of the level of relatedness between the byte-level message data stream and the energy signal at a specific point in time. A high value for the regression coefficient, i.e. high relatedness, indicates that the byte-level data stream, i.e. CAN ID (and the corresponding parent ECU ID) is associated with a component that is drawing the corresponding power at that time. A low value of regression coefficient reveals that there is little or no relationship between the variability of both features, i.e. CAN ID and component power. The online multivariable regression program is an iterative process, wherein each of the CAN IDs are assessed until all CAN IDs are evaluated. If all CAN IDs are not evaluated, the program iterates to the next CAN ID and re-starts the process by selecting a new CAN ID. This iterative process is performed in conjunction with the power signature evaluation. With reference to FIG. 3, once all the CAN IDs have been evaluated the program moves on to evaluating the power signatures. Again if all power signatures are not evaluated, the program iterates to the next power signature and re-starts the process by selecting a new power signature for the selected CAN ID. Once all power signatures are evaluated and associated with the relevant CAN ID, the algorithm for decoding the CAN ID messages is initiated. The decoding of the signal is performed in a feature ranked order for each of the power signatures. The relatedness of a particular data stream and a power signal at a particular point will be calculated. This is the regression coefficient, the higher the value, the more related the data stream and energy signal. The highest coefficient for a particular energy signal will be chosen as the ECU relating to that energy signal. The regression coefficient threshold value may be approximately R=0.7, therefore anything more than 0.7 (R>0.7) is considered high and anything less than 0.7 (R<0.7) is considered low. It will be understood by the skilled person that the regression coefficient threshold value may be a different value depending on the implementation of the regression coefficient with the data.

Step 6 of the process, as depicted in FIG. 3, provides the sub-steps 302 of decoding the CAN ID messages per disaggregated power signal. The disaggregation is performed by separating the energy in proportion to the amount of variance captured by each data stream. The resultant disaggregated energy signal is associated with the ECU ID of the byte level stream. The decoding is commenced by selecting the top ranked feature associated with each power signature. The top ranked feature is matched to known power system characteristics through power system heuristics knowledge base, i.e. from already known component power signatures. The top ranked feature is then output with the labelled CAN ID for the known ECU with the corresponding disaggregated power signal. The next ranked feature is then sent to the output with the labelled CAN ID. This is repeated for each of the features in order of rank until all CAN IDs are decoded. The output labelled CAN IDs for the known ECUs and corresponding disaggregated power signal is then provided for the informative purposes it was intended. Decoding of the ECU ID occurs by using heuristics associated with the energy use, system design and operator behaviour. After implementing this method in an EV vehicle, over time the data from the system will provide desirable information which can be extracted for component monitoring, inferring driver behaviour and optimising power distribution. Gradually over the course of potentially multiple weeks enough information will have been collated that the CAN-bus streams will become easily associated with electricity use and vice-versa.

Figure 4:
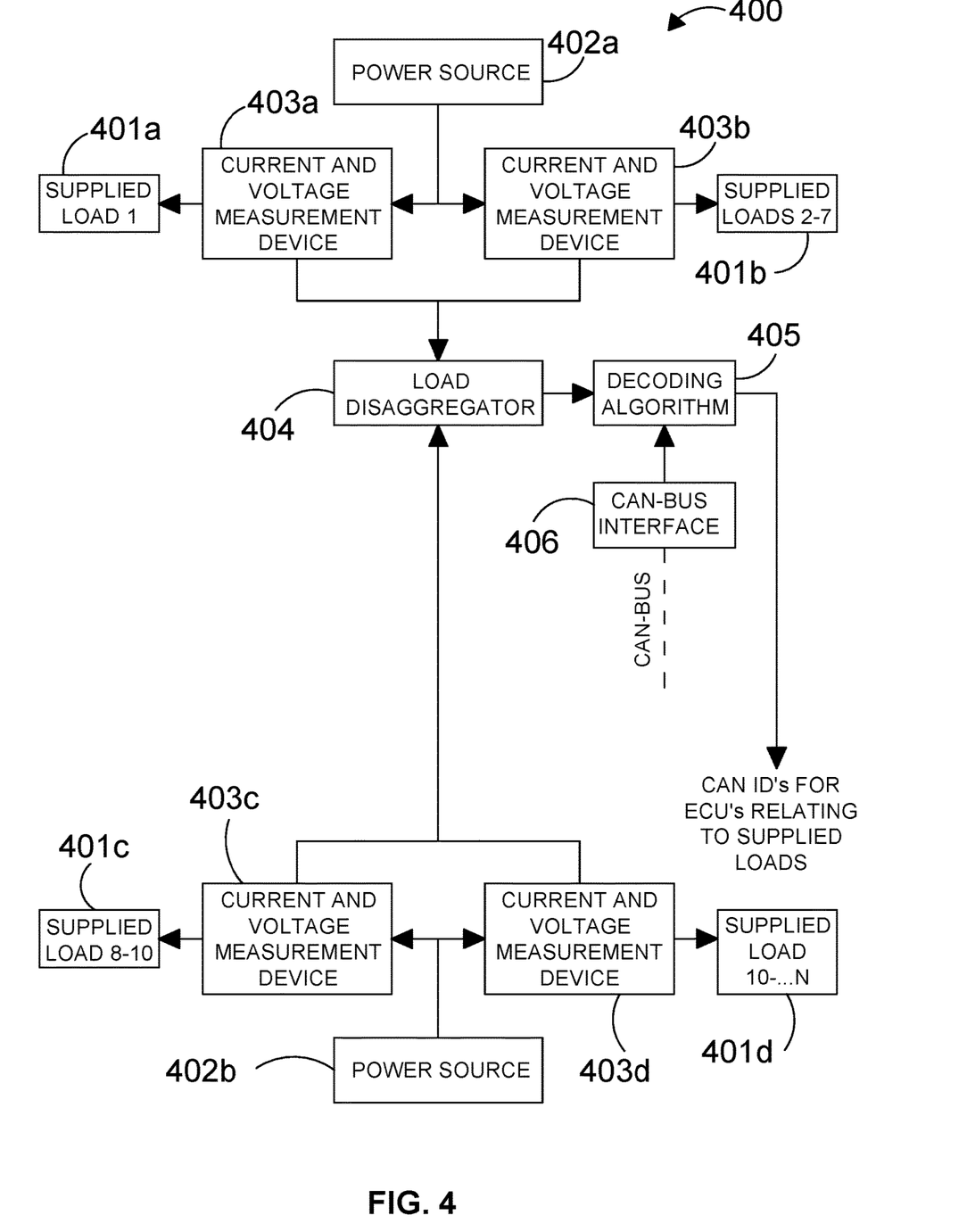
FIG. 4 depicts a schematic version of a system architecture.

FIG. 4 represents a simple abstract system architecture 400 for ease of understanding of a preferred embodiment of the invention. The plurality of electrical components 401, circuit loads, are driven by a power source 402, e.g. a battery. Power outputs of the plurality of components are measured by a connected current and voltage measurement device 403 across each of the plurality of loads 401. The aggregated electrical consumption signal of the loads, from the current and voltage measurement device(s), are sent to the load disaggregator 404 for signal disaggregation. The signals from the load disaggregator 404 and from a CAN-bus interface 406 are decoded using the algorithm, as previously discussed in this document, to determine the CAN ID's for ECU's relating to supplied loads.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A message ID decoding method for a system comprising multiple components interlinked by a Controller Area Network bus (CAN-bus) through which messages are sent, the method comprising:
   acquiring a CAN-bus message data stream comprising multiple CAN-bus messages, each CAN-bus message comprising a CAN ID, each CAN ID indicating a component from which the corresponding CAN-bus message originated;
   storing the multiple CAN-bus messages in a first datastore;
   acquiring an electricity consumption signal, wherein the electricity consumption signal is indicative of the electricity consumption of a component in the system, system;
   storing the electricity consumption signal in a second datastore;
   generating multiple time-stamp bins, each time-stamp bin corresponding to an interval in time;
   selecting, from their respective datastores, the CAN ID and a portion of the electricity consumption signal, the CAN ID and the portion of the electricity consumption signal being from the interval in time corresponding to the time-stamp bin; and
   determining a regression coefficient, indicating a level of relatedness between the selected CAN ID and the selected portion of electricity consumption signal, thereby correlating the CAN ID of the CAN-bus message with a component.

2. The method of claim 1, wherein the CAN-bus messages are communicated on a CAN-bus network.

3. The method of claim 1, wherein the CAN-bus messages are acquired and stored in real time.

4. The method of claim 1, wherein the CAN-bus messages are stored by multiple subsets, each subset comprising a plurality of CAN-bus messages with the same CAN ID.

5. The method of claim 1, wherein each CAN ID of the corresponding CAN-bus message is associated with a component having an electronic control unit (ECU) ID.

6. The method of claim 1, wherein the CAN-bus messages are managed by a CAN controller.

7. The method of claim 1, further comprising a CAN-bus interface module, wherein the CAN-bus interface module is configured to listen to and monitor the multiple CAN-bus messages on a CAN-bus network, acquire the CAN-bus messages, or store the multiple CAN-bus messages in a datastore.

8. The method of claim 1, wherein the multiple components and electricity consumption signal are accessed and controlled by a power distribution unit (PDU).

9. The method of claim 1, wherein the electricity consumption signal is an aggregated signal, comprising an aggregation of electricity consumption signals from the multiple components.

10. The method of claim 9, further comprising disaggregating the electricity consumption signal based on a relatedness value of the regression coefficient.

11. The method of claim 8, wherein the PDU comprises a power processing unit (PPU).

12. The method of claim 1, wherein each component has a corresponding power signature.

13. The method of claim 12, wherein each power signature is acquired by measuring a current and voltage signal of each component as a time series.

14. The method of claim 1, wherein acquiring the CAN-bus message data stream and the electricity consumption signal are performed simultaneously.

15. The method of claim 1, wherein the multiple time-stamp bins are generated for the CAN-bus message data stream and the multiple time-stamp bins are generated for the electricity consumption signal.

16. The method of claim 1, wherein time-stamp bins corresponding to a higher frequency signal, of the CAN-bus message data stream or the electricity consumption signal, are adjusted down to time-stamp bins corresponding to a lower frequency signal.

17. The method of claim 1, wherein time-stamp bins corresponding to a lower frequency signal, of the CAN-bus message data stream or the electricity consumption signal, are adjusted up to time-stamp bins corresponding to a higher frequency signal.

18. The method of claim 1, wherein the time-stamp bins of the CAN-bus message data stream and the time-stamp bins of the electricity consumption signal are the same.

19. The method of claim 1, wherein the CAN-bus messages are aligned with the electricity consumption signal through multivariable regression.

20. The method of claim 1, wherein a regression time interval for determining the regression coefficient is <1 second.

21. The method of claim 1, wherein a high value of regression coefficient R>0.7 indicates a high level of relatedness.

22. The method of claim 1, wherein a low value of regression coefficient R<0.7 indicates a low level of relatedness.

23. The method of claim 1, wherein the CAN-bus messages are decoded per an electrical power signal based on known power system characteristics and heuristic energy use.

24. A system or module for decoding message IDs of multiple electrical components on a CAN-bus network, wherein the system or module comprises a processor for executing the method of claim 1.

25. A non-transitory computer readable medium storing program steps that, when executed on a processor, causes the processor to execute the method of claim 1.

* * * * *